US006296761B1

(12) United States Patent
Scheuerman, III

(10) Patent No.: US 6,296,761 B1
(45) Date of Patent: Oct. 2, 2001

(54) WATER TREATMENT PROCESS

(75) Inventor: Clarence Scheuerman, III, Westlake, OH (US)

(73) Assignee: Applied Specialties, Inc., Avon Lake, OH (US)

( * ) Notice: Subject to any disclaimer, the term of this patent is extended or adjusted under 35 U.S.C. 154(b) by 0 days.

(21) Appl. No.: 09/519,926

(22) Filed: Mar. 7, 2000

Related U.S. Application Data

(62) Division of application No. 09/099,351, filed on Jun. 18, 1998, now Pat. No. 6,059,974.
(60) Provisional application No. 60/050,200, filed on Jun. 19, 1997.

(51) Int. Cl.[7] .................................................. B01J 49/00
(52) U.S. Cl. ......................... 210/189; 210/269; 210/284
(58) Field of Search .................................. 210/189, 269, 210/284

(56) References Cited

U.S. PATENT DOCUMENTS

| 2,697,724 | 12/1954 | Collier | 210/189 |
|---|---|---|---|
| 2,702,275 | 2/1955 | Bauman | 210/667 |
| 2,754,261 | 7/1956 | Akeroyd | 210/673 |
| 3,445,382 | * 5/1969 | Wace | 210/189 |
| 3,607,739 | 9/1971 | Thorborg | 210/189 |
| 3,658,699 | * 4/1972 | Ryan et al. | 210/189 |
| 3,691,109 | 9/1972 | Larsen | 210/677 |
| 3,985,648 | 10/1976 | Casolo | 210/669 |
| 4,299,922 | * 11/1981 | Holl et al. | 210/673 |
| 4,894,168 | 1/1990 | Holl et al. | 210/673 |
| 5,292,439 | 3/1994 | Morita et al. | 210/638 |
| 5,306,399 | 4/1994 | Bradbury et al. | 204/1.5 |
| 5,378,366 | 1/1995 | Yen | 210/667 |
| 5,468,395 | 11/1995 | Caroon et al. | 210/774 |
| 5,500,127 | 3/1996 | Carey et al. | 210/685 |
| 5,569,380 | 10/1996 | Sullivan | 210/266 |
| 5,571,419 | 11/1996 | Obata et al. | 210/664 |

OTHER PUBLICATIONS

*Kirk–Othmer Concise Encyclopedia of Chemical Technology,* John Wiley & Sons, Inc. (1985) pp. 665–666.

* cited by examiner

Primary Examiner—Ivars Cintins
(74) *Attorney, Agent, or Firm*—Pearne & Gordon LLP

(57) ABSTRACT

An improved water softening process is provided which also reduces anion content. A first stream of water is passed through an anion-exchange unit to remove undesirable anions and raise the pH. The first stream of water is then provided to reactor/clarifier water softening equipment, where it acts as a source of hydroxyl ions. Preferably a second stream of water which did not pass through an anion-exchange unit is also provided to the water softening equipment. The streams of water are combined and processed through the softening equipment, where hardness ions are precipitated out, yielding softened water with reduced anion content. The anion-exchange system utilized preferably has a counter-current continuous resin train and a counter-current continuous resin regeneration unit.

17 Claims, 2 Drawing Sheets

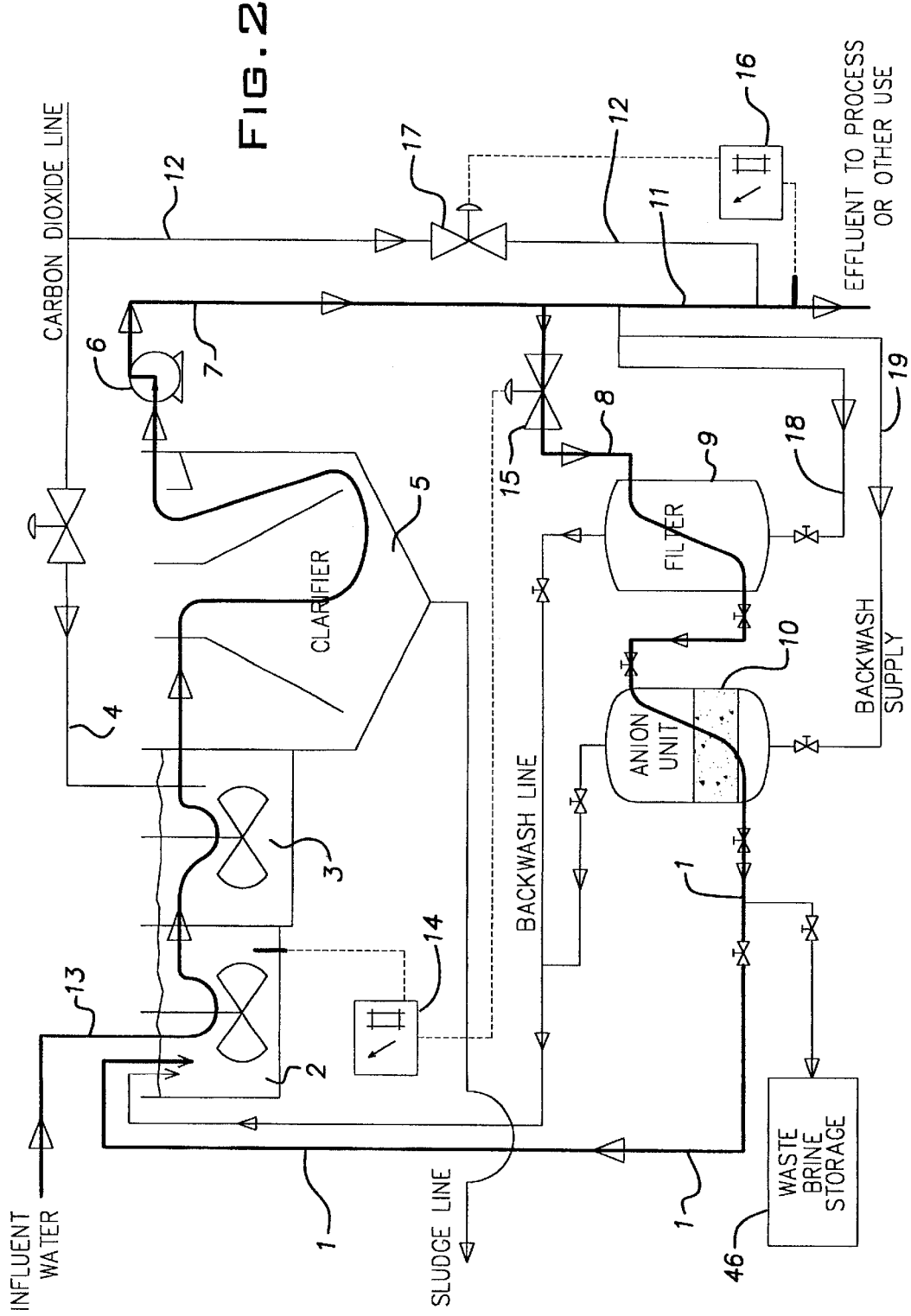

WATER TREATMENT PROCESS

This application is a division of U.S. application Ser. No. 09/099,351, filed Jun. 18, 1998, now U.S. Pat. No. 6,059,974.

This application claims the benefit of U.S. Provisional Application No. 60/050,200, filed Jun. 19, 1997.

FIELD OF THE INVENTION

The invention relates generally to water treatment and more particularly to an improved process for softening water while reducing anion content.

DESCRIPTION OF RELATED ART

Hardness in water is a common problem. Hardness in water is due primarily to the presence of $Ca^{2+}$ and $Mg^{2+}$, and also to the presence of $Ba^{2+}$ and $Sr^{2+}$, all of these being hardness ions. Water is said to be "softened" when these cations are removed, such as by water softening equipment. For large-scale or large volume water softening, the traditional process is called cold lime or cold lime-soda softening. In this process the lime can be either hydrated lime ($Ca(OH)_2$) or quicklime (CaO). In large systems the lime source is stored in a storage vessel. If quicklime is used, it must first be converted to hydrated lime ($Ca(OH)_2$) by being slaked, that is, combined with water. In any event, $Ca(OH)_2$ is provided and is diluted in a lime slurry, where the $Ca(OH)_2$ dissociates into $Ca^{2+}$ and $2OH^-$. This lime slurry is then fed to the reaction section of the lime softening equipment, where the OH– combines with $Mg^{2+}$ to form $Mg(OH)_2$, which precipitates out. The original $Ca^{2+}$ hardness in the water, and the $Ca^{2+}$ introduced via dissolved lime, are removed by a different reaction. If there is sufficient natural bicarbonate ($HCO_3^-$) in the water, some of the $OH^-$ will react therewith to yield carbonate ($CO_3^{2-}$), which will combine with the $Ca^{2+}$ to form $CaCO_3$, which precipitates out. If there is insufficient natural bicarbonate, soda ash ($Na_2CO_3$) is added (which converts to $2Na^+$ and $CO_3^{2-}$) and again the $CaCO_3$ forms and precipitates out. (Soda ash usage unfortunately adds substantial $Na^+$ to the finished water). As an alternative to using $Ca(OH)_2$ as the source of $OH^-$, sodium hydroxide (caustic soda) (NaOH) has been and is used. Sodium hydroxide also adds significant quantities of sodium ion to the final water and removes essentially no anions other than bicarbonate.

The traditional lime process generates considerable sludge, being $CaCO_3$ and $Mg(OH)_2$, and does little if anything to reduce chloride content and has limited capability to reduce any of the other anion content (sulfate, phosphate, nitrate) of the initial water. When it is necessary to use soda ash (due to low influent bicarbonate content), the traditional process increases the sodium content of the final effluent.

As can be seen, the key to removing hardness is the introduction of $OH^-$. The $OH^-$ converts $Mg^{2+}$ to $Mg(OH)_2$, and converts $HCO_3^-$ to $CO_3^{2-}$, which then reacts with $Ca^{2+}$ to form $CaCO_3$. (If there is insufficient natural $HCO_3^-$, $Na_2CO_3$ is added). In the traditional hydrated lime treatment process, the $OH^-$ is supplied via $Ca(OH)_2$. It is also traditional to use NaOH as the $OH^-$ source with the lime treatment equipment.

There is a need for an improved water softening process which eliminates or reduces the drawbacks of the traditional lime softening process.

SUMMARY OF THE INVENTION

A process for softening water comprising the steps of
(a) passing a first stream of water through an anion-exchange unit to raise the pH of said first stream and provide a second stream of water having a pH of at least 9.5;
(b) providing said second stream of water to water softening equipment comprising reactor and clarifier sections, said second stream of water being used as a source of hydroxyl ions in said water softening equipment;
(c) processing a fourth stream of water through said water softening equipment, said fourth stream comprising said second stream; and
(d) operating said water softening equipment on said fourth stream of water to remove via precipitation reactions hardness ions from said fourth stream and to provide thereby a fifth stream of water.

An anion-exchange system comprising a counter-current continuous resin regeneration unit is also provided.

BRIEF DESCRIPTION OF THE DRAWINGS

FIG. 2 is a schematic diagram of an alternate water treatment process according to the invention.

DETAILED DESCRIPTION OF THE PREFERRED EMBODIMENTS OF THE INVENTION

Figure 1:
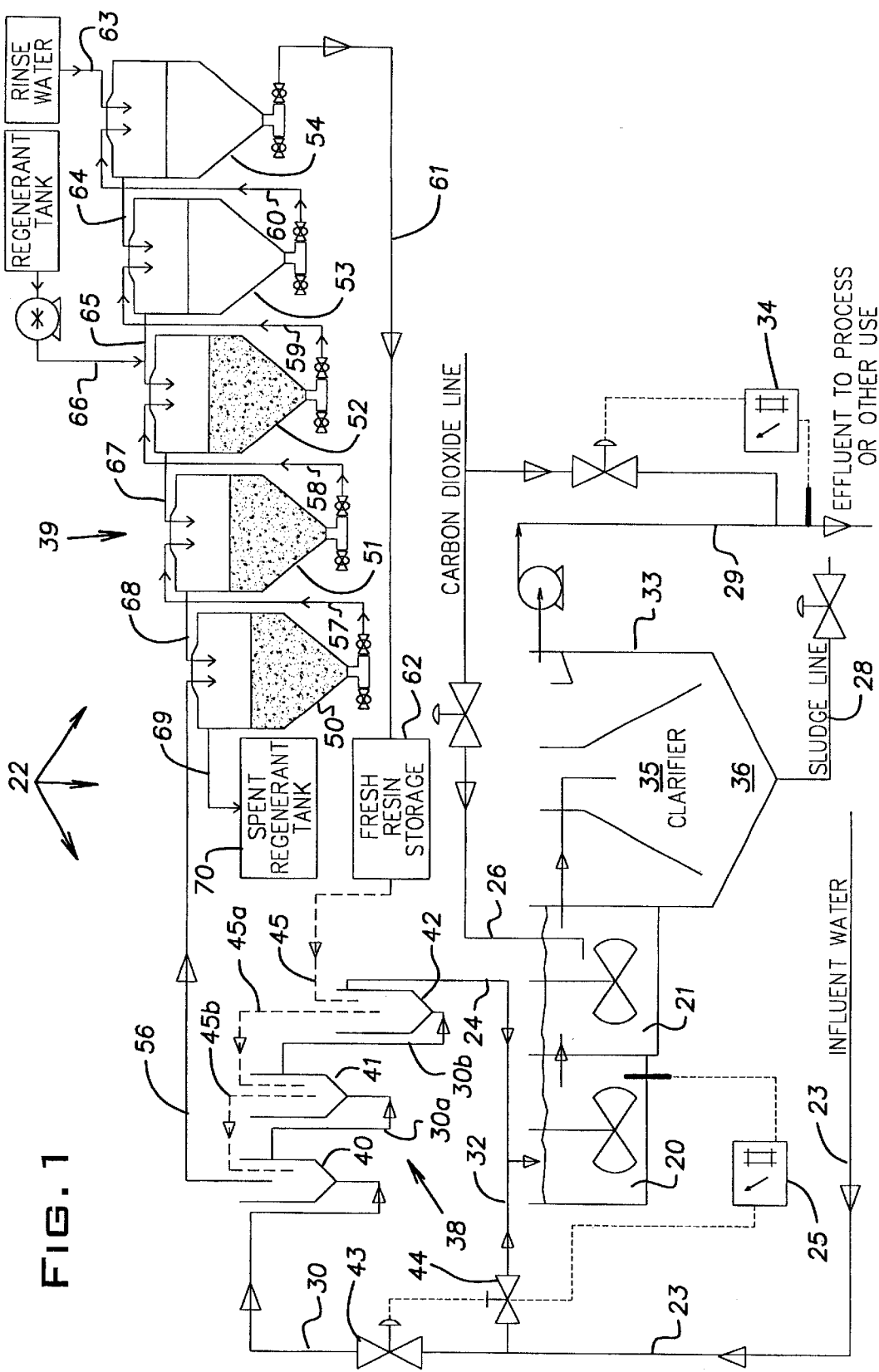
FIG. 1 is a schematic diagram of a water treatment process according to the invention.

As used herein, parts are parts by weight unless otherwise indicated and parts per million (ppm) and parts per billion (ppb) are parts by weight. When a preferred range such as 5–25 is given, this means preferably at least 5 and preferably not more than 25.

With reference to FIG. 1 the diagram includes a conventional lime/soda water softening equipment or contact solids water treatment unit or portion or system (reactor/clarifier) which is basically operated as water softening equipment in the conventional manner except as noted. This water softening equipment consists essentially of a first stage mixing tank or reaction zone or section 20, an optional second stage mixing tank or reaction zone or section 21 and a clarifier or clarifier section 33 having a flocculation zone 35 and a settling zone 36.

Other conventional cold or hot process lime or lime/soda water softening equipment or contact solids reactor/clarifier can be used. Influent water (typically pH 6–8 or about 7) to be treated comes in via line 23 at a flow rate of preferably 20–5000, more preferably 50–1000, more preferably 100–800, optionally 200–600, gallons per minute; some or all (preferably 10–100%, more preferably 25–50%, more preferably 30–40%, more preferably about 33%) of the influent water passes through line 30 to the anion-exchange unit 38 for anion-exchange and the remainder of the influent water passes through line 32 directly to mixing tank 20, lines 30 and 32 each being portions of line 23. This is preferably controlled by pH controller 25 or similar device sensing tank 20 and controlling valves 43 and/or 44. Preferably pH controller 25 senses the pH of tank 20 and controls the valves 43 and/or 44 so as to maintain the pH of tank 20 at a pH of at least 9.5, more preferably at least 9.8, more preferably at least 10, more preferably at least 10.3, more preferably at least 10.6, more preferably at least 10.9, optionally at least 11.3. The pH of tank 20 is preferably 10–12.5, more preferably 10.3–12, more is preferably 10.3–11.6, more preferably 10.6–11.2. The preferred method is to control the flow through line 32; less preferred is to control the flow of water through line 30. If all the influent water is diverted through the anion-exchange unit, this usually results in the water in tank 20 being too caustic; however, in some situations all the influent water can go through the anion-exchange unit, so the pH of the effluent from the anion-exchange unit is the pH of the water in tank 20. The preferred maximum pH of the effluent from the anion-exchange unit is 13.3 or, more preferably, 13.

The influent water is preferably at ambient temperature and is preferably neither heated nor chilled during the process. Sometimes the influent water may be above or below ambient, such as hot influent water received from a cooling tower.

The traditional ion exchange unit has two parts, the cation unit and the anion unit. In most installations the water first goes into a cation unit, where the cations including $Ca^{2+}$ and $Mg^{2+}$ sorb to the resin, releasing $H^+$. The water then goes to the anion unit, where the anions (sulfate $SO_4^{2-}$, nitrate $NO_3^-$, phosphate $PO_4^{3-}$, chloride $Cl^-$, silicate $SiO_4^{4-}$, etc.) sorb onto the resin, releasing $OH^-$. Then the $H^+$ and $OH^-$ combine to yield ion-free, or deionized, water.

In the present invention only the second of these two units, the anion unit, is used. The anion unit basically takes the naturally occurring anions (sulfate, nitrate, chloride, etc.) out of the water and produces a caustic, alkaline solution high in $OH^-$. This alkaline, high pH solution is then used in the treatment equipment as a source of $OH^-$ and thus eliminating the need for either $Ca(OH)_2$ or NaOH.

Anion-exchange system 22 is shown having an anion-exchange unit 38 which in this embodiment is counter-current continuous anion-exchange resin train 38 (comprising first stage tank 40, second stage tank 41 and third stage tank 42), and a counter-current continuous resin regeneration unit 39 having first stage tank 50, second stage tank 51, third stage tank 52, fourth stage tank 53 and fifth stage tank 54. Anion-exchange unit 38 and regeneration unit 39 are operated as fluidized beds. Anion-exchange unit or resin train 38 is shown having three conebottom tanks 40–42; it may optionally have 2–6 or more preferably 3–5 tanks. Each such tank is filled preferably to 20% to 40% of capacity with anion-exchange resin, preferably in bead form as is known in the art. There is a sufficient number of tanks in the train 38 and each tank is of sufficient size so that the total contact time of the water with the resin beads is preferably 10–30, more preferably 15–25, minutes, so as to permit effective anion exchange on the resin. Thus if the flow rate through the resin train 38 is 100 gallons per minute and there are three tanks each 40% filled with resin beads, each tank may preferably be 1667 gallons. Influent water travels through the tanks 40–42 through line 30, then line 30*a*, then line 30*b*, then exiting through line 24.

Typically there are 5–7 tanks in regeneration unit 39, each typically about half the size of the tanks in train 38. Regeneration unit 39 is run so that the resin beads are regenerated at about the same rate or speed as they are used up in train 38. The resin beads go through the resin train 38 via the pathway of line 45, then line 45*a*, then line 45*b*. To be regenerated, the resin beads follow the pathway of line 56 then lines 57, 58, 59, 60, and 61 to storage tank 62. The rinse water (preferably from tank 42) goes through lines 63, 64 and 65 to tank 52. Regenerant solution (preferably 50% NaOH) goes through line 66 into tank 52 where it joins the rinse water to form a typical 4% NaOH brine, then through lines 67, 68 and 69 to spent regenerant tank 70. Spent regenerant is preferably collected into a separate clarifier where calcium sulfate, calcium carbonate, magnesium hydroxide and other precipitants and suspended solids that are flushed from the regenerating resin are collected.

The preferred counter-current design does not require the installation of a pre-filter as the counter-current principal continuously flushes the resin and suspended solids are washed away. In addition, the counter-current design does not require a backwash step prior to the regeneration of the anion resin. This method also uses far less resin and has a lower resin 17 capitol cost. Compared with the batch system, the resin is also less stressed with less cracking and breakage and regeneration 19 rates are far higher yielding better regenerant usage and lower regenerant cost. The continuous counter-current design also uses water from the process (such as from tank 42) as resin rinse water and regenerant dilution water. The spent regenerant from the counter-current process will be a high solids salt solution such as NaCl, $Na_2SO_4$, $NaNO_3$, $Na_3PO_4$, $Na_2HPO_4$, etc. that is suitable for other uses. The concentration of this spent stream can be in the range of 4 to 7% depending on process design.

Less preferably counter-current continuous resin train 38 and/or counter-current continuous resin regeneration unit 39 can be a batch or single-tank process or system or setup using comparably or appropriately sized tanks as known in the art. Batch regeneration has the resin collected in a batch tank and then regenerated with regenerant solution. The regenerated resin is fed to a storage tank to supply regenerated resin to the head of the process train. Spent regenerant is allowed to settle in a storage tank where solids are separated off.

The anion-exchange resin is preferably a crosslinked polystyrene matrix, strongly basic anion-exchange resin, gel type (Type II), in bead form, preferably DIAION SA 20A from Mitsubishi Chemical, which are 0.4–0.6 mm diameter beads having a total capacity (Meq/ml)(Min.) of 1.3. Other DIAION anion-exchange resin beads from Mitsubishi Chemical can be used, including DIAION PA 408 and PA 418, which are porous type (Type II) having total capacity (Meq/ml)(Min.) of 0.9–1.3. Less preferred anion-exchange resin beads include Rohm and Haas Amberlite IRA-410, a strongly basic, Type II, quaternary ammonium anion-exchange resin, and weakly basic anion-exchange resins made of crosslinked polymethacrylate and crosslinked polyacrylate, and Type I anion-exchange resins. Useful anion-exchange resin beads may also be obtained from Dow Chemical, Purolite, Mobay, and other sources as known in the art.

In the anion-exchange unit 38 anions such as $Cl^-$, $SO_4^{2-}$, $NO_3^-$ and other anions (phosphate, silicate, etc.) are removed and are replaced by $OH^-$ ions, thus raising the pH and becoming a caustic solution. The treated water leaving the anion-exchange unit 38 via line 24 has a pH of preferably 9.5–13.3 as described above, more preferably 12–12.8, more preferably about 12.3–12.5. The water from line 24 combines with untreated water from line 32 and goes into mixing tank 20.

Mixing tank 20 is sized as a function of the flow rate to provide preferably 10–30, more preferably about 15, minutes of contact time. Thus a flow rate of 10 gallons per minute with 15 minutes contact time would require a 150 gallon tank. In tank 20 $OH^-$ combines with $Mg^{2+}$ to yield $Mg(OH)_2$ precipitate. (Silicate is co-precipitated in this process). The OH⁻ also combines with naturally occurring HCO$_3^-$ to yield CO$_3^{2-}$, which combines with Ca$^{2+}$ to form CaCO$_3$ precipitate. In tank 20 there is precipitated primarily Mg(OH)$_2$ and as much CaCO$_3$ as the natural HCO$_3^-$ alkalinity will permit. If there is sufficient natural HCO$_3^-$ carbonate alkalinity, then mixing tank 21 is not needed.

Optional mixing tank 21 is the same size as tank 20. If natural bicarbonate alkalinity is low or insufficient, carbon dioxide can be fed or injected via line 26 into mixing tank 21 to force the precipitation of calcium as calcium carbonate. (CO$_2$+2OH⁻→H$_2$O+CO$_3^{2-}$; CO$_3^{2-}$+Ca$^{2+}$→CaCO$_3$). This can be controlled by a calcium hardness analyzer or a pH controller (not shown) sensing tank 21, where the pH is preferably 9.5–11.5, more preferably 10–11, more preferably 10.3–10.7. As has been described and as is shown in FIGS. 1 and 2, the water softening equipment is operated on the stream of water to remove via precipitation reactions hardness ions from the water to yield or provide a stream of water having reduced hardness and reduced anion content.

The effluent from tank 20 (or tank 21 if it is used) goes to clarifier 33 for flocculation, settling and clarification as known in the art. Clarifier 33 is sized as a function of flow rate and rise rate, as known in the art. Sludge is pumped via line 28 to a filter press or some similar dewatering device. Treated effluent water passes via line 29 to a process use or other end use or reuse as effectively softened water; it may optionally be neutralized to a lower controlled pH by addition of carbon dioxide via pH controller 34. Less preferably mineral acid can be used to lower the pH. If sent to a sewer or as process water, the pH is preferably 6–9; if sent for cooling water, the pH is typically 6 or 7 to 8.5.

Optionally a second clarifier can be provided between first stage mixing tank 20 and second stage mixing tank 21. In this configuration, high rates of magnesium and silica removal are achieved. The sludge from this intermediate clarifier will have commercial value for its magnesium hydroxide content (if the influent is not highly contaminated). The effluent from this intermediate clarifier is then passed into the second stage mixing tank where optional carbon dioxide is added and calcium carbonate is precipitated. This two-stage process has very high magnesium and calcium removal rates. The magnesium can be dropped to under 1 ppm with calcium reduced to under 10 ppm while sulfate can be reduce to under 50 ppm. Chloride reduction becomes a function of the counter-current stages used in the design or the recycle rate through the unit.

Similarly to FIG. 1, the invention can less preferably be practiced in a situation where the mixing tanks and clarifier are replaced by a lined or encased pond (such as a wastewater pond or environmental pond) or similar tankage. In such situations the ponds or tankage would have reactor and clarifier sections.

Alternatively, tank 20 can receive (a) effluent water from two or more separate or independent anion-exchange units and (b) untreated water (ie, water which has not gone through an anion-exchange unit) from one or two or more sources separate or independent of or in substitution for influent line 23 and/or line 32, such as a series of wells or a series of process lines to be softened for reuse. For example, line 30 could be from a first well and line 32 could be from a separate, second well.

FIG. 2 illustrates a less preferred water treatment system according to the invention. It is in most ways the same as FIG. 1. In FIG. 2 the thick line shows the principal flow of water. Line 1 carries alkaline solution (high in OH⁻) as anion unit effluent (pH preferably 11–13.1, more preferably 12.3–12.7) from the anion-exchange unit 10 to the first stage mixing tank or reaction zone 2. Mixing tank 2 also receives untreated influent water via line 13. The water then flows through optional second stage mixing tank or reaction zone 3, clarifier 5, and into line 7 via pump 6. A portion (typically less than half) of the water from line 7 (having pH of preferably 9.5–13.1, more preferably 10.3–10.7) is carried or supplied or sidestreamed via line 8 through deep media filter 9 to anion-exchange unit 10, where the process is repeated as described above. The portion to be diverted is controlled by pH controller 14 sensing tank 2 and controlling valve 15, using the same principles used in FIG. 1. The other portion of the water from line 7 is carried via line 11 to exit the system as end use or reuse or service water. Carbon dioxide can be added via line 12 as described above for FIG. 1 using pH controller 16 to control valve 17 to lower the pH as desired or needed. Filter 9 removes particulate or fines (down to about 1 micron particles) missed by or carried over from the clarifier. Any filter can be used; a backwash style is preferred.

A strong anion resin unit 10 (conventional bottle style) is installed consisting of its associated equipment including a caustic storage tank (either sodium, potassium or ammonium hydroxide). The size of anion unit 10 depends on the water quality, flow rate, contact time desired and how filled it is with anion-exchange resin beads (preferably 20–40%). Carbon dioxide can be provided via line 4 to the optional mixing tank 3 in the event there is insufficient bicarbonate alkalinity in the water.

As can be seen, the unit of FIG. 2 is constructed and operated in most respects the same as or comparable to the unit as; of FIG. 1. The mixing tanks 2, 3 and clarifier 5 are the same as in FIG. 1; the operating pHs and conditions and controls are the same or comparable. When the filter 9 and anion-exchange 16 unit 10 are filled with particulate, they are backwashed as shown via backwash supply lines 18, 19 with the backwash being added to tank 2. As an option there can be a second filter 9 and/or a second anion unit 10; the system can be switched to the backups while the first units are being backwashed and regenerated. After anion unit 10 is backwashed, it is regenerated by brining it with typically 4% NaOH, then slow rinsing, then fast rinsing, all as known in the art. The slow and rapid rinse waters may be piped to a storage tank, where they may be slowly pumped to tank 2; this is an optional step to reduce reject fluid loading. optionally, anion unit 10 and filter 9 can be replaced by a counter-current anion-exchange unit and counter-current regeneration unit as in FIG. 1.

In both FIGS. 1 and 2 the spent regenerant from the anion resin is collected in a storage tank 70 or 46 for off or on-site recovery; the sludge from the reactor/clarifier is also collected for off or on-site recovery. With respect to regenerant recovery processes, ammonium hydroxide can be used for anion regeneration and the spent regenerant can be mixed with the produced sludge to create a nitrogen-rich fertilizer. This fertilizer can be further augmented with phosphorus compounds. Optionally, potassium hydroxide can be used as the anion regenerant. The spent potassium hydroxide regenerant can be a valuable product for use in wastewater plants (activated waste plant). The potassium would provide a valuable nutrient. to the process. Where sodium hydroxide is used as the regenerant, the spent regenerant can be used as a reagent for aluminum processing, or a feed stock to caustic, soda ash or soda bicarbonate manufacture. If the water being treated contains high chlorides the spent regenerant can be used to manufacture sodium hypochlorite.

The sludge (sometimes referred to as lime sludge) produced can be (depending on the metals contained in the influent water) dried, pelletized and used in steel-making. Alternatively, the sludge (if derived from water free of heavy metals) can be used in a utility power station flue gas desulfurization unit. If lime is used as the regenerant, gypsum or calcium chloride can be obtained as useful by-products. The use of lime as a regenerant is desirable in waters with a high sulfate content or where there is a use for a gypsum slurry. If sodium or potassium hydroxide is used as the regenerant to treat high chloride waters the spent regenerant can be used as a feed stock to a diaphragm or membrane caustic plant to make the alkali and chlorine. For waters containing high sulfate where sodium or potassium hydroxide is used as regenerant, the spent regenerant is suitable as a feed stock to a LeBlanc Process (or comparable) soda ash, sodium bicarbonate or caustic manufacturing plant.

Additional benefits of the invented system are as follows. Organics such as oily materials that could normally foul an anion resin unit can be removed in the flocculation process or by continuous counter-current flow. Some portion of dissolved organic materials (primarily acids or anions) that would pass from a conventional lime softener are captured in the invented process. The amount of reduction is a function of the percent of flow through the anion circuit. Unlike Reverse Osmosis or evaporation technology, capital and operating costs are rather low. Maintenance is minimal and operating control is fairly simple. The unit can handle a wide variety of influent waters and can automatically adjust to changes in influent quality.

As can be seen, the anion-exchange units in FIGS. 1 and 2 are used independently of any cation-exchange unit; there is no cation-exchange unit (removing cations and adding $H^+$) prior to the water going through the clarifier. It is noted that a small cation-exchange unit can be added at the effluent end to polish the effluent water, such as to enhance the removal of sodium and/or lower the pH ($Na^+$ being replaced by $H^+$; $H^+$ combining with $OH^-$ to yield $H_2O$ ), prior to the effluent being sent out for use or service, but this is completely optional. This procedure is particularly useful in waters with low magnesium and calcium but high chloride content. Less preferably, where high sodium wastewaters are being treated a magnesium cycle cation-exchange unit may be placed in front of the anion train. (A magnesium cycle cation-exchange unit removes cations such as $Na^+$ from the water and replaces them with magnesium ions.) In this configuration sodium is removed and is replaced by magnesium and the magnesium is then dropped out in its normal fashion in the invented process.

The following Examples further illustrate various aspects of the invention.

EXAMPLE 1

A pilot plant was set up basically as shown in FIG. 1. Tanks 40–42 were each 30-gallon conebottom tanks; tank 20 was 30 gallons (pH about 11.3–11.6) and line 32 was controlled via pH controller 25. Tank 21 (30 gallons) was used and utilized $CO_2$ sparging via line 26 via a pH controller sensing tank 21 and maintaining pH at about 10.3–10.6. Clarifier 33 was a 70 gallon conebottom tank with overflow weir. The total flow rate was 6 gallons/min. with 2 gal/min. through line 30 to unit 38 and 4 gal/min. through line 32 directly to tank 20. Each of tanks 40–42 was filled with about one cubic foot (about 40% of capacity) of Mitsubishi DIAION SA 20A anion-exchange resin beads which had been prepared by soaking in 4% NaOH and rinsing in DI water. Total bead contact time was thus about 18 minutes.

Resin beads were moved periodically from tank 42 to tank 41 to tank 40, particularly when the pH dropped in tank 20. Tanks 50–54 were 15 gallons each; the rinse water in tank 54 came from tank 42 (pH 12.3–12.5). The regenerant solution into tank 52 was 50% NaOH. The spent regenerant solution from tank 50 (containing NaCl, $Na_2SO_4$, etc.) went to a recycling operation.

About 300 gallons each of five different source waters were run through the pilot plant. The results shown in Table 1 are the averages of three readings. Calcium is expressed as $CaCO_3$; magnesium is expressed as $CaCO_3$; chloride is expressed as NaCl; sulfate is expressed as $SO_4$; sodium is expressed as Na.

TABLE 1

| Source Water | Influent (ppm) | Effluent (ppm) | Percent Reduction |
| --- | --- | --- | --- |
| 1. wastewater 1 | | | |
| Calcium | 1703 | 33 | 98.08% |
| Magnesium | 671 | 0.2 | 99.97% |
| Chloride | 6800 | 2500 | 63.24% |
| Sulfate | 2160 | 417 | 80.69% |
| Sodium | 2860 | 2250 | 21.33% |
| 2. wastewater 2 | | | |
| Calcium | 1195 | 59 | 95.04% |
| Magnesium | 266 | 0.21 | 99.92% |
| Chloride | 5000 | 3850 | 23.00% |
| Sulfate | 2175 | 1236 | 43.17% |
| Sodium | 2700 | 2360 | 12.59% |
| 3. Cooling Tower water | | | |
| Calcium | 745 | 51 | 93.15% |
| Magnesium | 1072 | 0.21 | 99.98% |
| Chloride | 4700 | 3000 | 36.17% |
| Sulfate | 7710 | 5220 | 32.30% |
| Sodium | 3690 | 3210 | 13.01% |
| 4. well water 1 | | | |
| Calcium | 723 | 17 | 97.64% |
| Magnesium | 290 | 6 | 97.99% |
| Chloride | 500 | 390 | 22.00% |
| Sulfate | 582 | 49 | 91.55% |
| Sodium | 332 | 268 | 19.28% |
| 5. well water 2 | | | |
| Calcium | 112 | 10 | 91.41% |
| Magnesium | 1065 | 0.21 | 99.98% |
| Chloride | 150 | 50 | 66.67% |
| Sulfate | 68 | 0.3 | 99.56% |
| Sodium | 97 | 67 | 30.93% |

The results, particularly the percent reductions, were surprising and unexpected.

EXAMPLE 2

Table 2 shows, for selected components, test results of water sample Nos. 6, 7 and 8 which were run through a static lab test configured or patterned basically according to the design or configuration of FIG. 2, and run as per FIG. 2 described above. The resin beads were Mitsubishi Chemical DIAION SA 20A. The numbers are parts per million.

TABLE 2

| Component | Influent Water No. 6 | Effluent Water No. 6 | Influent Water No. 7 | Effluent Water No. 7 | Influent Water No. 8 | Effluent Water No. 8 |
| --- | --- | --- | --- | --- | --- | --- |
| Calcium (as Ca) | 462 | 28.9 | 26 | 25 | 30 | 24 |
| Magnesium (as Mg) | 240 | 0.147 | 6 | 0.145 | 5.4 | 0.14 |
| Chloride | 2600 | 1700 | 715 | 600 | 1450 | 730 |

TABLE 2-continued

| Component | Influent Water No. 6 | Effluent Water No. 6 | Influent Water No. 7 | Effluent Water No. 7 | Influent Water No. 8 | Effluent Water No. 8 |
|---|---|---|---|---|---|---|
| Sulfate | 15000 | 100 | 425 | 25 | 860 | 33 |
| Silica | 3.4 | 1.25 | 5 | <1.0 | 7.6 | <1.0 |
| Sodium | 2900 | 1740 | | | | |
| Potassium | 81.8 | 48.2 | | | | |
| Strontium | 7.18 | 1.35 | | | | |
| Lead | 0.127 | <0.01 | | | | |

These test results show that, to an extent that was surprising and unexpected, the process of the invention was effective in softening the water and reducing the content of selected components. The invention also surprisingly lowered the sodium and potassium concentrations, as shown in water sample No. 6.

In addition to softening the influent water, the invention also effectively reduces the concentration of undesirable anions (particularly chloride, sulfate, phosphate, nitrate and silicate) and reduces the concentration of undesirable amphoteric components and non-hardness cations. It is believed, and testing thus far has indicated, that the percent reductions shown in Table 3 can be achieved by the practice of the present invention; that is, the invention can be used to treat influent water having components (principally ionic material) in the following concentration ranges (ppm) so as to achieve the percent reductions in concentration listed. For ppm concentration calculations, Ca and Mg are expressed as $CaCO_3$; Cl is expressed as NaCl; sulfate is expressed as $SO_4$; phosphate is expressed as P; nitrate is expressed as $NO_3$; nitrite is expressed as $NO_2$; and silica is expressed as $SiO_2$. If there are two streams of water, the aggregate concentration of a component in the two streams is the concentration which would exist if the two streams were combined and mixed.

TABLE 3

| Component | Preferred Influent Water ppm | Less Preferred Influent Water ppm | Preferred Percent Reduction | Less Preferred Percent Reduction |
|---|---|---|---|---|
| Ca | 700–2000 | 100–5000 | at least 98% | at least 80, 90 or 95% |
| Mg | 200–1000 | 100–4000 | at least 99.9% | at least 85, 90 or 95% |
| Cl | 500–2000 | 100–7000 | at least 95% | at least 20, 40, 60, 80 or 90% |
| Sulfate | 500–2500 | 100–20,000 | at least 99% | at least 25, 40, 60, 80, 90 or 95% |
| Na or K | 300–1000 | 100–4000 | at least 25% | at least 10, 15 or 20% |
| Cu, Pb, Fe, Ba, Mn or Sr | 1–10 | 0.5–40 | at least 99% | at least 70, 80, 85, 90, 95 or 98% |
| Zn, Cr, As, Se, Ni, Ng, Cd or Al | 1–10 | 0.5–40 | at least 99% | at least 50, 70, 80, 90 or 95% |
| Phosphate | 0.3–4 | 0.1–10 | at least 99% | at least 50, 70, 80, 90 or 95% |
| Nitrate | 1–20 | 0.5–100 | at least 99% | at least 50, 70, 80, 90 or 95% |
| Nitrite or Mo | 1–30 | 0.5–100 | at least 99% | at least 50, 70, 80, 90 or 95% |
| F | 1–10 | 0.3–50 | at least 99% | at least 20, 40, 60, 80, 90 or 95% |
| Silica | 1–30 | 0.5–150 | at least 99% | at least 50, 70, 80, 90 or 95% |
| Cyanide | 2–20 | 0.5–80 | at least 95% | at least 40, 60, 70, 80 or 90% |

It is believed that Na and K are removed by association with $Mg(OH)_2$, magnesium silicate and $CaCO_3$ precipitates, such as by being entrained in the molecular structure or being tied up or adsorbed onto the surface, etc. Silica is removed by precipitation as magnesium silicate and/or anion exchange removal. The anions are removed in the anion exchange unit, by being entrained in the structure of other precipitates, by being adsorbed onto the surface of other precipitates, or in some cases by being removed as insoluble salt precipitates such as calcium phosphate or calcium sulfate or as complexes such as sodium ferrocyanide. With regard to the metal ions, some are amphoteric and are removed in the anion-exchange unit, others go through the anion exchange unit and precipitate out as their hydroxide or carbonate salt in the reactor/clarifier. The invented process and system will remove such ionic material as well or better than the traditional lime treatment system. The traditional lime treatment system produces considerable sludge; the present invention avoids this by minimizing sludge and waste production and eliminates many of the operational headaches of conventional lime treatment.

The present invention can be used to produce drinking water in areas of poor quality and to convert seawater into drinking water; it can clean or polish wastewater to create usable process water; it can polish process water for extended use. In areas with brackish water or high chloride or sulfate content, the invention can produce a rinse or process water that improves product quality in a process such as soda ash or sodium bicarbonate refining. In coastal areas it makes the production of magnesium hydroxide and magnesium oxide from seawater more economical and environmentally friendly. Gypsum, magnesium hydroxide and calcium carbonate may be individually formed. The effluent water from such a process could be sent to a reverse osmosis (RO) process to produce drinking water at a faction of the cost of normal RO processed seawater. With this process RO reject can be reintroduced into the head of the process to be reprocessed or evaporated to produce a medium quality sodium chloride.

Anion content in the final effluent is greatly reduced. These anions would include chloride, sulfate, nitrate, silicate, phosphate and organic acids. The elimination of the organic component has the added benefit of color reduction and lowering of Total Organic Carbon (TOC). When the invention is applied in a drinking water application, the lowering of TOC will result in a lower potential of making THMs (Tri-HaloMethanes).

Although the preferred embodiments of the invention have been shown and described, it should be understood that various modifications and changes may be resorted to without departing from the scope of the invention as disclosed and claimed herein.

What is claimed is:

1. An anion-exachange system comprising an anion-exchange unit and a counter-current continuous resin regeneration unit, said anion-exchange unit utilizing anion-exchange resin and being operable to exchange anions in an aqueous stream, said counter-current continuous resin regeneration unit being operable to receive used anion-exchange resin from said anion-exchange unit, regenerate said resin in a continuous counter-current manner, and return said regenerated resin to said anion-exchange unit for refuse, said resin regeneration unit comprising a plurality of regeneration tanks including a #1 regeneration tank and a #2 regeneration tank, said anion-exchange system further comprising a source of fresh regeneration solution connected by a first tube system to said #1 regeneration tank, said #1 regeneration tank connected by a second tube system to said #2 regeneration tank, said second tube system carrying effluent substantially free from anion-exchange resin from said #2 tank to said #1 tank, wherein said effluent carried from said #2 tank to said #1 tank originated as rinse water, said anion-exchange system further comprising a source of rinse water connected by a tube system to one of said plurality of regeneration tanks such that said rinse water flows over said anion-exchange resin and to said #1 regeneration tank, said source of rinse water being connected to a regeneration tank upstream of said #1 regeneration tank in the direction of regeneration flow.

2. An anion-exchange system according to claim 1, said resin regeneration unit comprising at least a first regeneration tank and a second regeneration tank, said regeneration unit being operable to (a) receive used anion-exchange resin in said first tank, said used anion-exchange resin having been used in said anion-exchange unit, (b) thereafter transfer regenerant liquid from said second tank to said first tank, (c) thereafter transfer said resin from said first tank to said second tank, and (d) thereafter add regenerant liquid to said second tank, said regenerant liquid transferred from said second tank to said first tank being more exhausted than said regenerant liquid added to said second tank.

3. An anion-exchange system according to claim 2, said regeneration unit being further operable to (e) after step (b) removing regenerant liquid from said first tank, said regenerant liquid removed from said first tank being more exhausted than said regenerant liquid transferred to said first tank from said second tank.

4. An anion-exchange system according to claim 1, wherein said anion-exchange unit is a counter-current continuous anion-exchange resin train.

5. An anion-exchange system according to claim 4, wherein said counter-current continuous anion-exchange resin train comprises at least two separate tanks.

6. An anion-exchange system according to claim 5, wherein each tank of said anion-exchange resin train is filled to 20% to 40% of capacity with anion-exchange resin in bead form.

7. An anion-exchange system according to claim 4, wherein said counter-current continuous anion-exchange resin train comprises at least three separate tanks.

8. An anion-exchange system according to claim 1, wherein said counter-current continuous resin regeneration unit comprises at least five tanks.

9. An anion-exchange system according to claim 1, wherein said anion-exchange unit is adapted to release hydroxyl ions.

10. An anion-exchange system according to claim 1, said system being operable to provide effluent from said anion-exchange unit as influent rinse water in said resin regeneration unit.

11. An anion-exchange system according to claim 1, said system being operable to provide effluent from said anion-exchange unit having a pH of at least 9.5.

12. An anion-exchange system according to claim 1, said system being operable to provide effluent from said anion-exchange unit having a pH of at least 10.6.

13. An anion-exchange system according to claim 1, said system being operable to provide effluent from said anion-exchange unit having a pH of at least 11.3.

14. An anion-exchange system according to claim 1, said system being operable to provide effluent from said anion-exchange unit having a pH of at least 12.

15. An anion-exchange system according to claim 1, wherein said fresh regenerant solution is NaOH solution.

16. An anion-exchange system according to claim 1, wherein said rinse water is provided as effluent from said anion-exchange unit.

17. An anion-exchange system according to claim 1, wherein said anion-exchange unit is adapted to treat about 33% of influent water coming into said anion-exchange system at a flow rate of 50–1000 gallons per minute.

\* \* \* \* \*

UNITED STATES PATENT AND TRADEMARK OFFICE
CERTIFICATE OF CORRECTION

PATENT NO. : 6,296,761 B1
DATED : October 2, 2001
INVENTOR(S) : Scheurman III

It is certified that error appears in the above-identified patent and that said Letters Patent is hereby corrected as shown below:

<u>Title page,</u>
Item [75], Inventors, delete "Scheuerman, III" and insert therefore
-- Scheurman III --.

<u>Column 4,</u>
Line 13, delete "17".
Line 15, delete "19".

<u>Column 6,</u>
Line 31, delete "as;".
Line 34, delete "16".
Line 45, delete "optionally," and insert therefore -- Optionally, --.
Line 60, delete "nutrient." and insert therefore -- nutrient --.

Signed and Sealed this

Twentieth Day of August, 2002

*Attest:*

JAMES E. ROGAN
*Director of the United States Patent and Trademark Office*

*Attesting Officer*